United States Patent [19]

Gurney

[11] Patent Number: 5,311,176
[45] Date of Patent: May 10, 1994

[54] METHOD AND APPARATUS FOR GENERATING WALSH CODES

[75] Inventor: David P. Gurney, Palatine, Ill.

[73] Assignee: Motorola, Inc., Schaumburg, Ill.

[21] Appl. No.: 860,871

[22] Filed: Mar. 31, 1992

[51] Int. Cl.$^5$ .......................... H03M 7/00; G06F 7/36
[52] U.S. Cl. ...................................... 341/50; 364/727
[58] Field of Search .......................... 370/22; 364/727; 341/50

[56] References Cited

U.S. PATENT DOCUMENTS

| | | | |
|---|---|---|---|
| 3,618,077 | 11/1971 | Peterson | 364/727 |
| 3,701,143 | 10/1972 | Nacht | 341/50 |
| 3,795,864 | 3/1974 | Fullton, Jr. | 370/22 |
| 3,859,515 | 1/1975 | Radcliffe, Jr. | 364/727 |
| 4,052,565 | 10/1977 | Baxter et al. | 179/1.55 |
| 4,811,357 | 3/1989 | Betts et al. | 375/1 |
| 4,901,307 | 2/1990 | Gilhousen et al. | 370/18 |
| 5,056,105 | 10/1991 | Darmon et al. | 375/1 |
| 5,101,501 | 3/1992 | Gilhousen et al. | 455/33 |
| 5,103,459 | 4/1992 | Gilhousen et al. | 375/1 |

FOREIGN PATENT DOCUMENTS

| | | | |
|---|---|---|---|
| 456268 | 2/1975 | U.S.S.R. | 364/727 |
| 596933 | 2/1978 | U.S.S.R. | 364/727 |
| 657428 | 4/1979 | U.S.S.R. | 364/727 |
| 666535 | 6/1979 | U.S.S.R. | 364/727 |
| 742912 | 6/1980 | U.S.S.R. | 364/727 |

OTHER PUBLICATIONS

Dixon, Robert C., *Spread Spectrum Systems 2nd Ed.*, John Wiley & Sons, New York, N.Y., 1984 Chapters 1 & 2, pp. 1–55.

Sklar, Bernard, *Digital Communications: Fundamentals and Applications*, Prentice Hall, Englewood Cliffs, N.J., 1988, Chapters 5 & 6 pp. 245–380.

"Two Classes of Convolutional Codes Over GF(q) for q-ary Orthogonal Signaling", William E. Ryan and Stephen G. Wilson, *IEEE Transactions on Communications*, vol. 39, No. 1 (Jan. 1988), pp. 30–40.

"On the System Design Aspects of Code Division Multiple Access (CDMA) Applied to Digital Cellular and Personal Communication sNetworks", Allen Salmasi and Klein S. Gilhousen, *Proceedings of 41st Vehicular Technology Conference* in St. Louis, Mo., May 19–22, 1991, pp. 57–62.

"Performance of Convolutional Codes with Interleaving in the Interference Limited Rayleigh Fading Channel", Li Fung Chang and Sirikiat Ariyavisitakul, *Proceedings of 41st Vehicular Technology Conference* in St. Louis, Mo., May 19–22, 1991, pp. 812–816.

*Primary Examiner*—Howard L. Williams
*Attorney, Agent, or Firm*—Shawn B. Dempster

[57] ABSTRACT

A method and apparatus is provided for generating Walsh codes. A first group of address signals is generated. Subsequently, inversion control signals are generated by logically gating the first group of address signals with a second group of address signals. Finally, a Walsh code is produced by inverting elements of a predetermined vector in accordance with the generated inversion control signals.

16 Claims, 3 Drawing Sheets

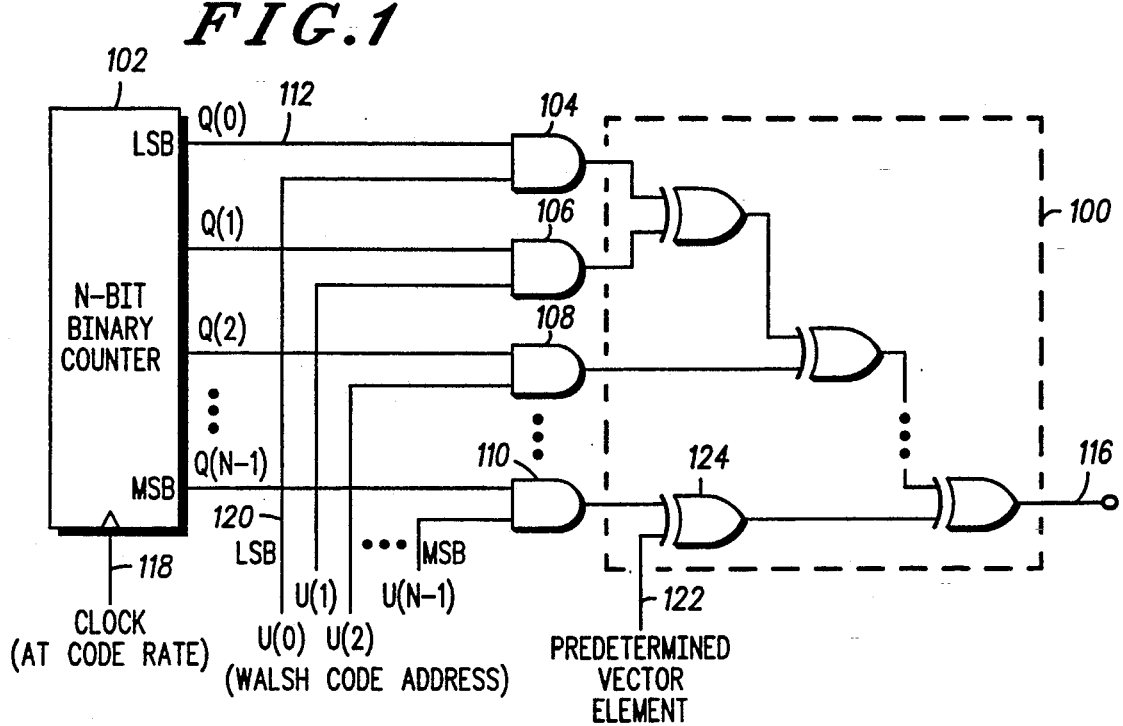

METHOD AND APPARATUS FOR GENERATING WALSH CODES

FIELD OF THE INVENTION

The present invention relates to communication systems and, more particularly, to a method and apparatus for generating Walsh Codes for use in a spread spectrum communication system.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

Two types of two-way communication channels exist, namely, point-to-point channels and point-to-multipoint channels. Examples of point-to-point channels include wirelines (e.g., local telephone transmission), microwave links, and optical fibers. In contrast, point-to-multipoint channels provide a capability where many receiving stations may be reached simultaneously from a single transmitter (e.g. cellular radio telephone communication systems). These point-to-multipoint systems are also termed Multiple Address Systems (MAS).

Analog and digital transmission methods are used to transmit a message signal over a communication channel. The use of digital methods offers several operational advantages over analog methods, including but not limited to: increased immunity to channel noise and interference, flexible operation of the system, common format for the transmission of different kinds of message signals, improved security of communication through the use of encryption, and increased capacity.

These advantages are attained at the cost of increased system complexity. However, through the use of very large-scale integration (VLSI) technology a cost-effective way of building the hardware has been developed.

To transmit a message signal (either analog or digital) over a band-pass communication channel, the message signal must be manipulated into a form suitable for efficient transmission over the channel. Modification of the message signal is achieved by means of a process termed modulation. This process involves varying some parameter of a carrier wave in accordance with the message signal in such a way that the spectrum of the modulated wave matches the assigned channel bandwidth. Correspondingly, the receiver is required to recreate the original message signal from a degraded version of the transmitted signal after propagation through the channel. The re-creation is accomplished by using a process known as demodulation, which is the inverse of the modulation process used in the transmitter.

In addition to providing efficient transmission, there are other reasons for performing modulation. In particular, the use of modulation permits multiplexing, that is, the simultaneous transmission of signals from several message sources over a common channel. Also, modulation may be used to convert the message signal into a form less susceptible to noise and interference.

For multiplexed communication systems, the system typically consists of many remote units (i.e. subscriber units) which require active service over a communication channel for a short or discrete portion of the communication channel resource rather than continuous use of the resources on a communication channel. Therefore, communication systems have been designed to incorporate the characteristic of communicating with many remote units for brief intervals on the same communication channel. These systems are termed multiple access communication systems.

One type of multiple access communication system is a spread spectrum system. In a spread spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal.

Three general types of spread spectrum communication techniques exist, including:

Direct Sequence

The modulation of a carrier by a digital code sequence whose bit rate is much higher than the information signal bandwidth. Such systems are referred to as "direct sequence" modulated systems.

Hopping

Carrier frequency shifting in discrete increments in a pattern dictated by a code sequence. These systems are called "frequency hoppers." The transmitter jumps from frequency to frequency within some predetermined set; the order of frequency usage is determined by a code sequence. Similarly "time hopping" and "time-frequency hopping" have times of transmission which are regulated by a code sequence.

Chirp

Pulse-FM or "chirp" modulation in which a carrier is swept over a wide band during a given pulse interval.

Information (i.e. the message signal) can be embedded in the spread spectrum signal by several methods. One method is to add the information to the spreading code before it is used for spreading modulation. This technique can be used in direct sequence and frequency hopping systems. It will be noted that the information being sent must be in a digital form prior to adding it to the spreading code, because the combination of the spreading code and the information typically a binary code involves modulo-2 addition. Alternatively, the information or message signal may be used to modulate a carrier before spreading it.

Thus, a spread spectrum system must have two properties: (1) the transmitted bandwidth should be must greater than the bandwidth or rate of the information being sent and (2) some function other than the information being sent is employed to determine the resulting modulated channel bandwidth.

Spread spectrum communication systems can be multiple access communication systems. One type of multiple access spread spectrum system is a code division multiple access (CDMA) system. In a CDMA system, communication between two communication units is accomplished by spreading each transmitted signal over the frequency band of the communication channel with a unique user spreading code. As a result, transmitted signals are in the same frequency band of the communication channel and are separated only by unique user spreading codes. These unique user spreading codes preferably are orthogonal to one another such that the cross-correlation between the spreading codes is approximately zero. CDMA systems may use direct sequence or frequency hopping spreading techniques. Particular transmitted signals can be retrieved from the communication channel by despreading a signal representative of the sum of signals in the communication channel with a user spreading code related to the particular transmitted signal which is to be retrieved from the communication channel. Further, when the user spreading codes are orthogonal to one another, the received signal can be correlated with a particular user spreading code such that only the desired user signal related to the particular spreading code is enhanced while the other signals for all of the other users are not enhanced.

It will be appreciated by those skilled in the art that several different spreading codes exist which can be used to separate data signals from one another in a CDMA communication system. These spreading codes include but are not limited to pseudo noise (PN) codes and Walsh codes. A Walsh codes corresponds to a single row or column of the Hadamard matrix. For example, in a 64 channel DDMA spread spectrum system, particular mutually orthogonal Walsh codes can be selected from the set of 64 Walsh codes within a 64 by 64 Hadamard matrix. Also, a particular data signal can be separated from the other data signals by using a particular Walsh code to spread the particular data signal.

Further it will be appreciated by those skilled in the art that spreading codes can be used to channel code data signals. The data signals are channel coded to improve performance of the communication system by enabling transmitted signals to better withstand the effects of various channel impairments, such as noise, fading, and jamming. Walsh codes can be used to channel code a data signal prior to modulation of the data signal for subsequent transmission. Similarly PN spreading codes can be used to channel code a data signal.

In order to use Walsh codes in signal spreading or channel coding, the Walsh codes must be readily available for use. One technique for making the Walsh codes readily available is to generate the Walsh codes by placing the desired Walsh codes in a memory-based lookup table. Subsequently, as each Walsh code is needed, it must be retrieved from the lookup table. Such a technique is relatively cost effective for generating small groups of Walsh codes, but as the size of the group of Walsh codes increases so must the size of the memory-based lookup table. In Application Specific Integrated circuit (ASIC) designs, increased memory demands can rapidly escalate the cost of producing an ASIC and can significantly affect the average power consumption levels of an ASIC. Thus, a need exists for a Walsh code generator circuit which requires no or at least minimal additional memory circuits and which have a lower average power consumption level than lookup table-based Walsh code generators.

SUMMARY OF THE INVENTION

A method and apparatus is provided for generating Walsh codes. A first group of address signals is generated. Subsequently, inversion control signals are generated by logically gating the first group of address signals with a second group of address signals. Finally, a Walsh code is produced by inverting elements of a predetermined vector in accordance with the generated inversion control signals.

BRIEF DESCRIPTION OF THE DRAWINGS

FIG. 1 is a diagram showing a preferred embodiment Walsh code generator.

FIG. 2 is a diagram showing a decomposed Hadamard matrix.

FIG. 3 is a diagram showing a how a Hadamard matrix breaks down into simple combinational circuitry.

DETAILED DESCRIPTION

Figure 4:
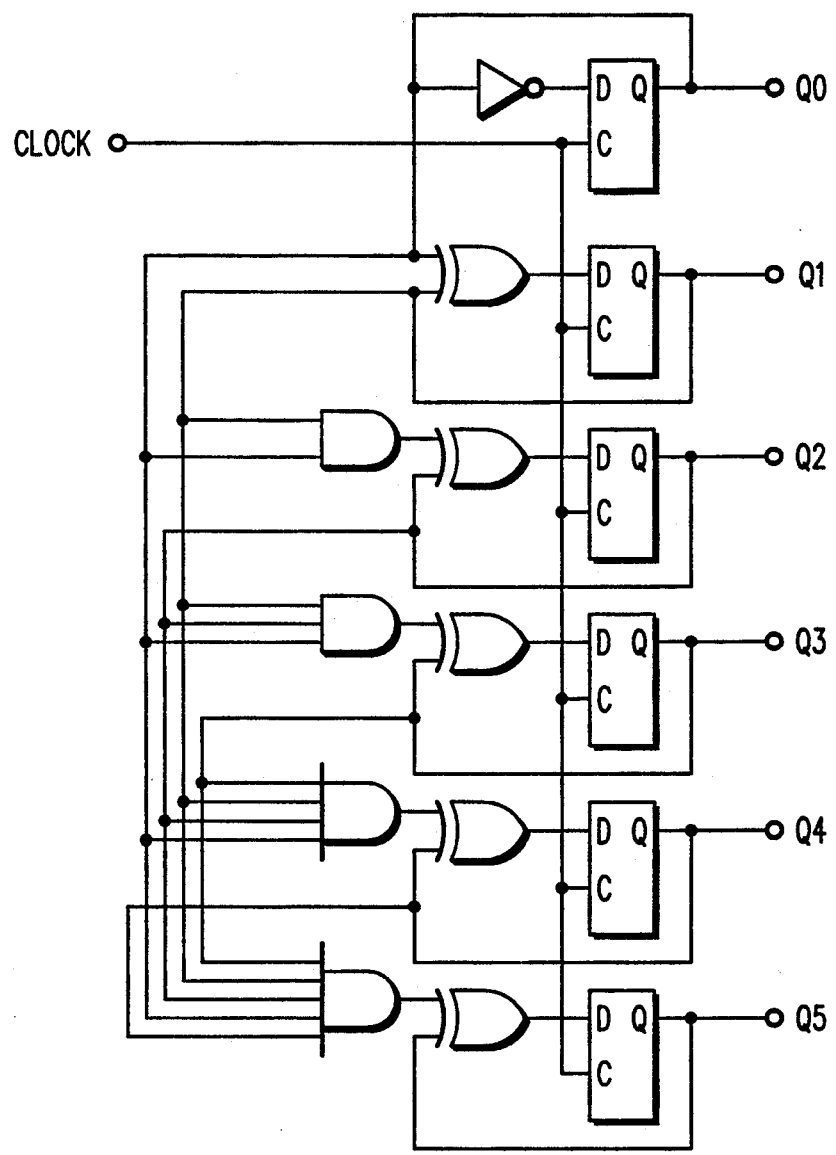
FIG. 4 is a circuit diagram of a preferred embodiment 6 bit synchronous counter.

Referring now to FIG. 1, a preferred embodiment Walsh code generator is shown. The Walsh code generator consists of a state machine 102, an addressing mechanism 104, 106, 108, and 110, as well as a code inversion device 100. In the preferred embodiment, the Walsh code generator generates sequences (i.e., rows or columns) of a 64 bit by 64 bit Hadamard matrix like the one shown in Table 1. It will be appreciated by those skilled in the art that the following techniques described can be readily adapted to generate other size Hadamard matrix sequences (i.e., other length Walsh codes).

TABLE 1

| Row | \multicolumn{16}{c}{Column} |
|---|---|---|---|---|---|---|---|---|---|---|---|---|---|---|---|---|
| | 0 | 4 | 8 | 12 | 16 | 20 | 24 | 28 | 32 | 36 | 40 | 44 | 48 | 52 | 56 | 60 |
| 0 | 0000 | 0000 | 0000 | 0000 | 0000 | 0000 | 0000 | 0000 | 0000 | 0000 | 0000 | 0000 | 0000 | 0000 | 0000 | 0000 |
| 1 | 0101 | 0101 | 0101 | 0101 | 0101 | 0101 | 0101 | 0101 | 0101 | 0101 | 0101 | 0101 | 0101 | 0101 | 0101 | 0101 |
| 2 | 0011 | 0011 | 0011 | 0011 | 0011 | 0011 | 0011 | 0011 | 0011 | 0011 | 0011 | 0011 | 0011 | 0011 | 0011 | 0011 |
| 3 | 0110 | 0110 | 0110 | 0110 | 0110 | 0110 | 0110 | 0110 | 0110 | 0110 | 0110 | 0110 | 0110 | 0110 | 0110 | 0110 |
| 4 | 0000 | 1111 | 0000 | 1111 | 0000 | 1111 | 0000 | 1111 | 0000 | 1111 | 0000 | 1111 | 0000 | 1111 | 0000 | 1111 |
| 5 | 0101 | 1010 | 0101 | 1010 | 0101 | 1010 | 0101 | 1010 | 0101 | 1010 | 0101 | 1010 | 0101 | 1010 | 0101 | 1010 |
| 6 | 0011 | 1100 | 0011 | 1100 | 0011 | 1100 | 0011 | 1100 | 0011 | 1100 | 0011 | 1100 | 0011 | 1100 | 0011 | 1100 |
| 7 | 0110 | 1001 | 0110 | 1001 | 0110 | 1001 | 0110 | 1001 | 0110 | 1001 | 0110 | 1001 | 0110 | 1001 | 0110 | 1001 |

TABLE 1-continued

| Row | 0 | 4 | 8 | 12 | 16 | 20 | 24 | 28 | 32 | 36 | 40 | 44 | 48 | 52 | 56 | 60 |
|---|---|---|---|---|---|---|---|---|---|---|---|---|---|---|---|---|
| 8 | 0000 | 0000 | 1111 | 1111 | 0000 | 0000 | 1111 | 1111 | 0000 | 0000 | 1111 | 1111 | 0000 | 0000 | 1111 | 1111 |
| 9 | 0101 | 0101 | 1010 | 1010 | 0101 | 0101 | 1010 | 1010 | 0101 | 0101 | 1010 | 1010 | 0101 | 0101 | 1010 | 1010 |
| 10 | 0011 | 0011 | 1100 | 1100 | 0011 | 0011 | 1100 | 1100 | 0011 | 0011 | 1100 | 1100 | 0011 | 0011 | 1100 | 1100 |
| 11 | 0110 | 0110 | 1001 | 1001 | 0110 | 0110 | 1001 | 1001 | 0110 | 0110 | 1001 | 1001 | 0110 | 0110 | 1001 | 1001 |
| 12 | 0000 | 1111 | 1111 | 0000 | 0000 | 1111 | 1111 | 0000 | 0000 | 1111 | 1111 | 0000 | 0000 | 1111 | 1111 | 0000 |
| 13 | 0101 | 1010 | 1010 | 0101 | 0101 | 1010 | 1010 | 0101 | 0101 | 1010 | 1010 | 0101 | 0101 | 1010 | 1010 | 0101 |
| 14 | 0011 | 1100 | 1100 | 0011 | 0011 | 1100 | 1100 | 0011 | 0011 | 1100 | 1100 | 0011 | 0011 | 1100 | 1100 | 0011 |
| 15 | 0110 | 1001 | 1001 | 0110 | 0110 | 1001 | 1001 | 0110 | 0110 | 1001 | 1001 | 0110 | 0110 | 1001 | 1001 | 0110 |
| 16 | 0000 | 0000 | 0000 | 0000 | 1111 | 1111 | 1111 | 1111 | 0000 | 0000 | 0000 | 0000 | 1111 | 1111 | 1111 | 1111 |
| 17 | 0101 | 0101 | 0101 | 0101 | 1010 | 1010 | 1010 | 1010 | 0101 | 0101 | 0101 | 0101 | 1010 | 1010 | 1010 | 1010 |
| 18 | 0011 | 0011 | 0011 | 0011 | 1100 | 1100 | 1100 | 1100 | 0011 | 0011 | 0011 | 0011 | 1100 | 1100 | 1100 | 1100 |
| 19 | 0110 | 0110 | 0110 | 0110 | 1001 | 1001 | 1001 | 1001 | 0110 | 0110 | 0110 | 0110 | 1001 | 1001 | 1001 | 1001 |
| 20 | 0000 | 1111 | 0000 | 1111 | 1111 | 0000 | 1111 | 0000 | 0000 | 1111 | 0000 | 1111 | 1111 | 0000 | 1111 | 0000 |
| 21 | 0101 | 1010 | 0101 | 1010 | 1010 | 0101 | 1010 | 0101 | 0101 | 1010 | 0101 | 1010 | 1010 | 0101 | 1010 | 0101 |
| 22 | 0011 | 1100 | 0011 | 1100 | 1100 | 0011 | 1100 | 0011 | 0011 | 1100 | 0011 | 1100 | 1100 | 0011 | 1100 | 0011 |
| 23 | 0110 | 1001 | 0110 | 1001 | 1001 | 0110 | 1001 | 0110 | 0110 | 1001 | 0110 | 1001 | 1001 | 0110 | 1001 | 0110 |
| 24 | 0000 | 0000 | 1111 | 1111 | 1111 | 1111 | 0000 | 0000 | 0000 | 0000 | 1111 | 1111 | 1111 | 1111 | 0000 | 0000 |
| 25 | 0101 | 0101 | 1010 | 1010 | 1010 | 1010 | 0101 | 0101 | 0101 | 0101 | 1010 | 1010 | 1010 | 1010 | 0101 | 0101 |
| 26 | 0011 | 0011 | 1100 | 1100 | 1100 | 1100 | 0011 | 0011 | 0011 | 0011 | 1100 | 1100 | 1100 | 1100 | 0011 | 0011 |
| 27 | 0110 | 0110 | 1001 | 1001 | 1001 | 1001 | 0110 | 0110 | 0110 | 0110 | 1001 | 1001 | 1001 | 1001 | 0110 | 0110 |
| 28 | 0000 | 1111 | 1111 | 0000 | 1111 | 0000 | 0000 | 1111 | 0000 | 1111 | 1111 | 0000 | 1111 | 0000 | 0000 | 1111 |
| 29 | 0101 | 1010 | 1010 | 0101 | 1010 | 0101 | 0101 | 1010 | 0101 | 1010 | 1010 | 0101 | 1010 | 0101 | 0101 | 1010 |
| 30 | 0011 | 1100 | 1100 | 0011 | 1100 | 0011 | 0011 | 1100 | 0011 | 1100 | 1100 | 0011 | 1100 | 0011 | 0011 | 1100 |
| 31 | 0110 | 1001 | 1001 | 0110 | 1001 | 0110 | 0110 | 1001 | 0110 | 1001 | 1001 | 0110 | 1001 | 0110 | 0110 | 1001 |
| 32 | 0000 | 0000 | 0000 | 0000 | 0000 | 0000 | 0000 | 0000 | 1111 | 1111 | 1111 | 1111 | 1111 | 1111 | 1111 | 1111 |
| 33 | 0101 | 0101 | 0101 | 0101 | 0101 | 0101 | 0101 | 0101 | 1010 | 1010 | 1010 | 1010 | 1010 | 1010 | 1010 | 1010 |
| 34 | 0011 | 0011 | 0011 | 0011 | 0011 | 0011 | 0011 | 0011 | 1100 | 1100 | 1100 | 1100 | 1100 | 1100 | 1100 | 1100 |
| 35 | 0110 | 0110 | 0110 | 0110 | 0110 | 0110 | 0110 | 0110 | 1001 | 1001 | 1001 | 1001 | 1001 | 1001 | 1001 | 1001 |
| 36 | 0000 | 1111 | 0000 | 1111 | 0000 | 1111 | 0000 | 1111 | 1111 | 0000 | 1111 | 0000 | 1111 | 0000 | 1111 | 0000 |
| 37 | 0101 | 1010 | 0101 | 1010 | 0101 | 1010 | 0101 | 1010 | 1010 | 0101 | 1010 | 0101 | 1010 | 0101 | 1010 | 0101 |
| 38 | 0011 | 1100 | 0011 | 1100 | 0011 | 1100 | 0011 | 1100 | 1100 | 0011 | 1100 | 0011 | 1100 | 0011 | 1100 | 0011 |
| 39 | 0110 | 1001 | 0110 | 1001 | 0110 | 1001 | 0110 | 1001 | 1001 | 0110 | 1001 | 0110 | 1001 | 0110 | 1001 | 0110 |
| 40 | 0000 | 0000 | 1111 | 1111 | 0000 | 0000 | 1111 | 1111 | 1111 | 1111 | 0000 | 0000 | 1111 | 1111 | 0000 | 0000 |
| 41 | 0101 | 0101 | 1010 | 1010 | 0101 | 0101 | 1010 | 1010 | 1010 | 1010 | 0101 | 0101 | 1010 | 1010 | 0101 | 0101 |
| 42 | 0011 | 0011 | 1100 | 1100 | 0011 | 0011 | 1100 | 1100 | 1100 | 1100 | 0011 | 0011 | 1100 | 1100 | 0011 | 0011 |
| 43 | 0110 | 0110 | 1001 | 1001 | 0110 | 0110 | 1001 | 1001 | 1001 | 1001 | 0110 | 0110 | 1001 | 1001 | 0110 | 0110 |
| 44 | 0000 | 1111 | 1111 | 0000 | 0000 | 1111 | 1111 | 0000 | 1111 | 0000 | 0000 | 1111 | 1111 | 0000 | 0000 | 1111 |
| 45 | 0101 | 1010 | 1010 | 0101 | 0101 | 1010 | 1010 | 0101 | 1010 | 0101 | 0101 | 1010 | 1010 | 0101 | 0101 | 1010 |
| 46 | 0011 | 1100 | 1100 | 0011 | 0011 | 1100 | 1100 | 0011 | 1100 | 0011 | 0011 | 1100 | 1100 | 0011 | 0011 | 1100 |
| 47 | 0110 | 1001 | 1001 | 0110 | 0110 | 1001 | 1001 | 0110 | 1001 | 0110 | 0110 | 1001 | 1001 | 0110 | 0110 | 1001 |
| 48 | 0000 | 0000 | 0000 | 0000 | 1111 | 1111 | 1111 | 1111 | 1111 | 1111 | 1111 | 1111 | 0000 | 0000 | 0000 | 0000 |
| 49 | 0101 | 0101 | 0101 | 0101 | 1010 | 1010 | 1010 | 1010 | 1010 | 1010 | 1010 | 1010 | 0101 | 0101 | 0101 | 0101 |
| 50 | 0011 | 0011 | 0011 | 0011 | 1100 | 1100 | 1100 | 1100 | 1100 | 1100 | 1100 | 1100 | 0011 | 0011 | 0011 | 0011 |
| 51 | 0110 | 0110 | 0110 | 0110 | 1001 | 1001 | 1001 | 1001 | 1001 | 1001 | 1001 | 1001 | 0110 | 0110 | 0110 | 0110 |
| 52 | 0000 | 1111 | 0000 | 1111 | 1111 | 0000 | 1111 | 0000 | 1111 | 0000 | 1111 | 0000 | 0000 | 1111 | 0000 | 1111 |
| 53 | 0101 | 1010 | 0101 | 1010 | 1010 | 0101 | 1010 | 0101 | 1010 | 0101 | 1010 | 0101 | 0101 | 1010 | 0101 | 1010 |
| 54 | 0011 | 1100 | 0011 | 1100 | 1100 | 0011 | 1100 | 0011 | 1100 | 0011 | 1100 | 0011 | 0011 | 1100 | 0011 | 1100 |
| 55 | 0110 | 1001 | 0110 | 1001 | 1001 | 0110 | 1001 | 0110 | 1001 | 0110 | 1001 | 0110 | 0110 | 1001 | 0110 | 1001 |
| 56 | 0000 | 0000 | 1111 | 1111 | 1111 | 1111 | 0000 | 0000 | 1111 | 1111 | 0000 | 0000 | 0000 | 0000 | 1111 | 1111 |
| 57 | 0101 | 0101 | 1010 | 1010 | 1010 | 1010 | 0101 | 0101 | 1010 | 1010 | 0101 | 0101 | 0101 | 0101 | 1010 | 1010 |
| 58 | 0011 | 0011 | 1100 | 1100 | 1100 | 1100 | 0011 | 0011 | 1100 | 1100 | 0011 | 0011 | 0011 | 0011 | 1100 | 1100 |
| 59 | 0110 | 0110 | 1001 | 1001 | 1001 | 1001 | 0110 | 0110 | 1001 | 1001 | 0110 | 0110 | 0110 | 0110 | 1001 | 1001 |
| 60 | 0000 | 1111 | 1111 | 0000 | 1111 | 0000 | 0000 | 1111 | 1111 | 0000 | 0000 | 1111 | 0000 | 1111 | 1111 | 0000 |
| 61 | 0101 | 1010 | 1010 | 0101 | 1010 | 0101 | 0101 | 1010 | 1010 | 0101 | 0101 | 1010 | 0101 | 1010 | 1010 | 0101 |
| 62 | 0011 | 1100 | 1100 | 0011 | 1100 | 0011 | 0011 | 1100 | 1100 | 0011 | 0011 | 1100 | 0011 | 1100 | 1100 | 0011 |
| 63 | 0110 | 1001 | 1001 | 0110 | 1001 | 0110 | 0110 | 1001 | 1001 | 0110 | 0110 | 1001 | 0110 | 1001 | 1001 | 0110 |

Shown in Table 1 is Hadamard matrix ($H_6$). Every Hadamard matrix has the following properties:

(1) $H_n$ is square symmetric and of dimension $2^n$ by $2^n$;

(2) The rows of the $H_n$ (Walsh codes) are mutually orthogonal and have a period of length $T=2^n$;

(3) $H_{n+1}$ takes the form $$\begin{bmatrix} H_n & H_n \\ H_n & \overline{H_n} \end{bmatrix};$$

(4) All of the information needed to generate any dimension $H_n$ is contained in $H_0=[0]$ by using the property in line (3).

By further analyzing the properties expressed in lines (3) and (4), it will be noted that any size Hadamard matrix can be decomposed into $H_0$, and lesser dimensioned $H_n$'s repeat periodically (i.e., with controlled complementing) within the matrix. Thus, the Hadamard matrix (and hence all possible Walsh sequences for that dimension) can be generated from the null (all zeroes) vector and the controlled complementing of that vector in a manner similar to that which is shown in line (3) above. It will be appreciated by those skilled in the art that, although the discussion in based on the null vector ($H_0=0$), $H_0$ could also be equal to 1.

This above description can be applied to digital circuits. For example, the Walsh codes are repeated periodically with a period of $2^n$ which is equivalent to an n bit state machine such as a synchronous or asynchronous counter (e.g., n bit binary counter). Further, the controlled complementing function can be implemented through a series of exclusive OR (XOR) gates or a parity checker circuit. Furthermore, since complementing is equivalent to a linear operation (multiplication), it is commutative (i.e., the order of the inversion does not matter). Therefore, the complementing stages can be cascaded (e.g., XOR gate tree) in any order with no loss of generality.

By definition, for any (non zero) n-dimensional Hadamard matrix, if $i \geq 2^{n-1}$ and $j \geq 2^{n-1}$, where i and j are the row column indices ranging from 0 to $2^n-1$, then the subsequent terms are inverted, independent of previous inversion. In fact, since the matrix is recursively defined, if (i mod $2^k \geq 2^{k-1}$) and (j mod $2^k \geq 2^{k-1}$), where k=n, n−1, n−2, . . . , 1, then the term (i,j) is inverted. This follows from the decomposition of the matrix using the generation method in reverse (as shown in FIG. 2). The matrix can therefore be decomposed into the null vector and periodic inversion of it. This inversion process, since it is periodic (and always has a length of a power of 2), can be accomplished with a binary counter 102 (i.e., a counter is used for the column index, because the Walsh code is output by sequentially increasing the column index). In fact, the recursive inversion test above (for column j) is satisfied by square waves with periods of $2^k$, and a 50% duty cycle (a k-bit binary counter), where a "one" from any of the counter 102 output lines (e.g., line 112) independently signifies that an inversion of the term is necessary. In digital electronic hardware, these recursive inversions take place simultaneously, but remain valid. Since the matrix is square symmetric, the same relationships hold for the row index, but in our case this index is held constant, in accordance with generating the desired Walsh sequence number code (by reading off across the same row). The binary representation of the row index can be seen to perform its half of the recursive inversion test above (for row i) by determining which counter lines are used in the inversion process through the use of AND gating (e.g., gates 104, 106, 108, and 110) to choose when to ignore invalid inversion signals. Clearly, the controlled inversion operation described above can be performed digitally by exclusive OR gates and a binary counter, so the entire recursive inversion test can be satisfied in hardware.

Logically, the generation of any term in the Hadamard matrix breaks down into simple combinational circuitry, as shown in FIG. 3. The row and column address control the complementing (by determining which quadrant of the matrix the term is in). As is shown, $H_2$ is generated by controlled complementing of $H_1$ (when in the lower right hand quadrant 130). This process can be extended to allow generation of any term in a given Hadamard matrix.

The basic structure of the Walsh function generator circuit is shown in FIG. 4. In summary, for the generation of a n-dimensional Hadamard matrix (length $2^n$ Walsh sequences), a n-bit binary counter 102 is used to control the inversion of the null vector through the use of cascaded exclusive OR gates 100 (in essence, this counter sequentially addresses the column index of the matrix). In the preferred embodiment, the n-bit counter is a 6 bit synchronous binary counter like the one shown in FIG. 4. A n-bit bus 114 contains the binary representation of the which Walsh sequence is to be generated (the row index of the matrix or Walsh code address), which determines which counter lines are used in the complementing process (through the use of AND gating (e.g., gates 104 through 110). This allows selected counter lines (e.g., line 112) to complement the sequence as desired. Note that since all possible Walsh sequences are periodic and originate from the null vector, the complementing process is cascadable with no ill effects on the validity of the output codes, as mentioned above. Input line 122 provided the predetermined vector to the code inversion device 100. In the preferred embodiment, the null vector or zero is provided on input line 122 to XOR gate 124. In fact, in the preferred embodiment the XOR gate 124 is not needed, since the null vector is used. However, it will be appreciated by those skilled in the art that other input vectors could be used by the Walsh code generator such as an all "ones" vector or any other predetermined vector. This method is extendible to any dimension n, and allows the production of any one of the $2^n$ possible Walsh sequences.

The cascaded exclusive OR gates 100 used above are functionally equivalent to a n-input XOR gate, or an odd parity checker, and may be substituted with such devices. Typically, the row number (Walsh code address) is held on a data bus 114 by an n-bit register. The binary counter 102 is clocked 118 at the desired sequence output rate, and the delay until a valid output code is limited only by the propagation delay of the combinational logic. This circuit could be made to operate at very high rates, especially if the design is pipelined. The output 116 of the circuit is in the desired format (the Walsh codes are user selectable or addressable on data bus 114 and periodically repeated) for digital CDMA radio.

Figure 5:
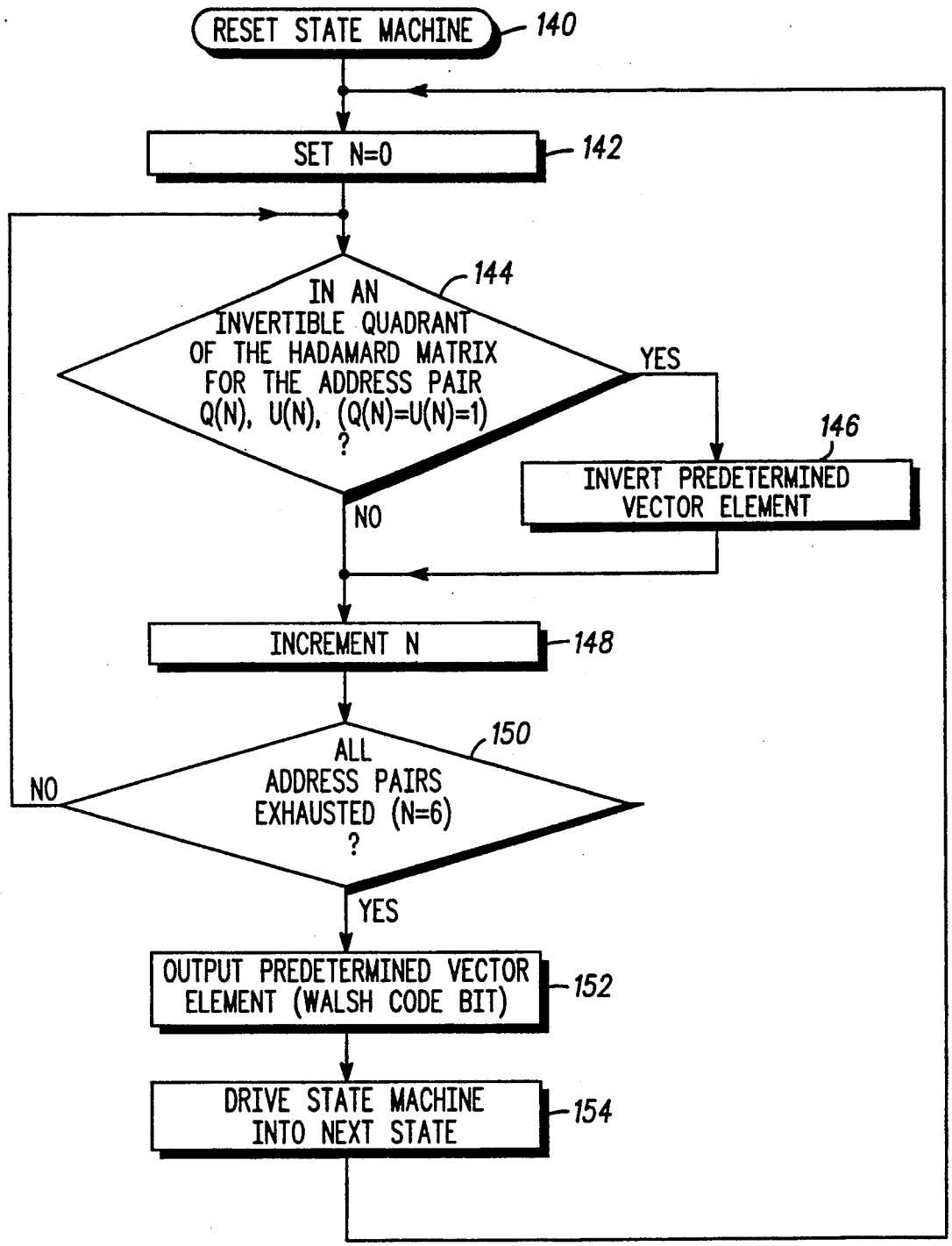
FIG. 5 is a flowchart showing operation of the preferred embodiment Walsh code generator shown in FIG. 1.

Referring now to FIG. 5, a flowchart showing operation of the preferred embodiment Walsh code generator shown in FIG. 1. The state machine 102 is reset 140 (initiated). An index N is set to zero 142. Subsequently, the addressing mechanism (i.e., gates 104 through 110) determines 144 if the address pair Q(N), U(N) (e.g., counter output line 112 and Walsh code address line 120, respectively) points to an invertible quadrant of the Hadamard matrix (i.e., Q(N)=U(N)=1). If the address pair Q(N), U(N) points to an invertible quadrant, then the particular vector element is inverted 146 by the code inversion device 100 and then the index N is incremented. Otherwise, if the address pair Q(N), U(N) does not point to an invertible quadrant, then the index N is incremented 148. Subsequently, the Walsh code generator determines 150 if all address pairs Q(N), U(N) have been exhausted (i.e., N=6). If the address pairs are not exhausted, then the Walsh code generator returns to element 144 and continues operations. Otherwise, the predetermined vector element (i.e., Walsh code bit) is output 152 on output line 116. Subsequently, the state machine 102 is driven to the next state 154 (i.e., the counter is incremented) and the Walsh code generator returns to element 142 and continues operations.

In summary, a preferred embodiment Walsh code generator is shown in FIG. 1. The Walsh code generator consists of a state machine 102, an addressing mechanism 104, 106, 108, and 110, as well as a code inversion device 100. The state machine generates a first group of address signals. The state machine 102 may be either a synchronous counter, an asynchronous counter, or a pseudo random code generator. Further, the state machine 102 preferably is a six bit length binary counter. In addition, the state machine 102 may include a clocking mechanism 118 for controlling the rate at which the Walsh codes are to be generated. The first group of address signals determines which elements of the Walsh code are to be generated. The addressing mechanism 104, 106, 108, and 110 is operatively coupled to the state machine 102. The addressing mechanism generates inversion control signals (i.e., the outputs of gates 104 through 110) by logically gating the first group of address signals (e.g., clock output line 112) with a second group of address signals (e.g., Walsh code address line 120). The second group of address signals determines which Walsh code is to be generated. In the preferred embodiment, the address mechanism generates one of the inversion control signals by performing a logical AND of an address signal (e.g., line 112) from the first group of address signals and an address signal (e.g., line 120) from the second group of address signals. The code inversion device 100 is operatively coupled to the address mechanism such that a Walsh code is produced by inverting elements of a predetermined vector 122 in accordance with the generated inversion control signals (i.e., the outputs of gates 104 through 110). In the preferred embodiment, the predetermined vector 122 is a null vector. Further, the code inversion device 100 may be a parity checker having a group of inputs and at least one output such that each input receiving one of the inversion control signals from the address mechanism and the output 116 provides a sequence of bits representing the produced Walsh code.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

What is claimed is:

1. A Walsh code generator, comprising:
   (a) counter means for generating a first group of address signals;
   (b) address means, operatively coupled to the counter means, for generating inversion control signals by logically gating the first group of address signals with a second group of address signals; and
   (c) code inversion means, operatively coupled to the address means, for producing a Walsh code by inverting elements of a predetermined non-null vector through an Exclusive-OR logical gating with the generated inversion control signals.

2. The Walsh code generator of claim 1 wherein the counter means comprises a state machine selected from a group consisting essentially of a synchronous counter and an asynchronous counter.

3. The Walsh code generator of claim 1 wherein the counter means comprises a six bit length binary counter.

4. The Walsh code generator of claim 1 wherein the counter means comprises a clocking means for controlling a rate at which the Walsh codes are to be generated.

5. The Walsh code generator of claim 1 wherein the first group of address signals determines which elements of the Walsh code are to be generated.

6. The Walsh code generator of claim 1 wherein the second group of address signals determines which Walsh code is to be generated.

7. The Walsh code generator of claim 1 wherein the address means generates one of the inversion control signals by performing a logical AND of an address signal from the first group of address signals and an address signal from the second group of address signals.

8. The Walsh code generator of claim 1 wherein the code inversion means comprises a parity checker having a group of inputs and at least one output, each input receiving one of the inversion control signals from the address means, the output providing a sequence of bits representing the produced Walsh code.

9. A method of generating Walsh codes, comprising:
   (a) generating a first group of address signals;
   (b) generating inversion control signals by logically gating the first group of address signals with a second group of address signals; and
   (c) producing a Walsh code by inverting elements of a predetermined non-null vector through an Exclusive-OR logical gating with the generated inversion control signals.

10. The method of claim 9 wherein the step of generating a first group of address signals comprises utilizing a state machine selected from a group consisting essentially of a synchronous counter and an asynchronous counter.

11. The method of claim 9 wherein the step of generating a first group of address signals comprises utilizing a six bit length binary counter.

12. The method of claim 9 wherein the step of generating a first group of address signals comprises utilizing a clocking means for controlling a rate at which the Walsh codes are to be generated.

13. The method of claim 11 wherein the first group of address signals determines which elements of the Walsh code are to be generated.

14. The method of claim 11 wherein the second group of address signals determines which Walsh code is to be generated.

15. The method of claim 11 wherein the step of generating inversion control signals comprises performing a logical AND of an address signal from the first group address signals and an address signal from the second group of address signals.

16. The method of claim 9 wherein the step of producing a Walsh code comprises utilizing a parity checker having a group of inputs and at least one output, each input receiving one of the inversion control signals, the output providing a sequence of bits representing the produced Walsh code.

* * * * *